United States Patent Office 3,483,199
Patented Dec. 9, 1969

3,483,199
WATER-SOLUBLE DERIVATIVES OF TETRACYCLINES
Joao Jose Rodiles Frausto da Silva, Lisbon, Portugal, assignor to Cipan-Companhia Industrial Produtora de Antibioticos S.A.R.L., Societe Anonyme, Lisbon, Portugal, a Portuguese concern
No Drawing. Filed Nov. 9, 1966, Ser. No. 592,968
Claims priority, application Portugal, Nov. 10, 1965, 44,855
Int. Cl. C07c 103/19; A61k 21/00
U.S. Cl. 260—247.2
4 Claims

ABSTRACT OF THE DISCLOSURE

Water-soluble derivatives of a tetracycline, for example, chlortetracycline, are prepared by reacting the tetracycline compound with an amine nitrogenous base, such as morpholine, in the presence of dimethylsulfoxide.

---

The present invention relates to new water-soluble derivatives of the tetracyclines with the following general formula:

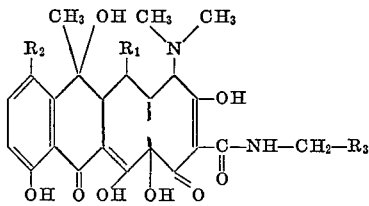

where $R_1$ represents hydrogen or a hydroxyl group, $R_2$ represents an atom of hydrogen or halogen and $R_3$ is a radical of nitrogen bases, aliphatic or aromatic, cyclic or not, such as piperidine, morpholine, pyrrolidine, benzylamine, furfurylamine, aniline, N-($\beta$-hydroxyethyl)diethylenediamine, 1-azaspiro(4,5)decane, aminoacids, glucosamine, and other hydroxyalkylamines.

According to the invention, these compounds are made by the direct condensation of nitrogen bases with tetracyclines in the presence of dimethylsulfoxide (DMSO), that acts as a reagent for introducing a methylene group. This substance with the formula $CH_3$—$SO$—$CH_3$ has been considered as a solvent of uncommon properties and only very recently its real possibilities as a reagent were appreciated.

I have discovered a method to carry out asymmetric insertions of the methylene radical (—$CH_2$—) between the amide group of tetracyclines and several nitrogen bases such as amines. This new reaction which is very fast, takes place in seconds even below room temperature and gives high yields of very pure products, is successfully applicable to the preparation of therapeutically important water-soluble derivatives of tetracyclines.

According to the invention, the derivatives are prepared by reacting tetracyclines such as tetracycline, 7-chlorotetracycline or 5-hydroxytetracycline with a nitrogenous base in the presence of dimethylsulfoxide. The nitrogenous base may be an amine which may be cyclic or non-cyclic and which may include other functional groups such as hydroxy or carboxy. More particularly, the amine may be an amino acid or an alkyl amine, cycloalkyl amine, aryl amine, aralkyl amine, or hydroxyalkyl amine.

EXAMPLE 1

N-(morpholinomethyl)-tetracycline

Ten grams of tetracycline (base) were dissolved in 30 ml. of dimethylsulfoxide at room temperature and under stirring with a magnetic stirrer. To this solution, 2.16 gm. of freshly distilled morpholine are added dropwise at room temperature, with stirring. Adding 200 ml. of n-butyl alcohol, and 1.5 liters of diethyl ether, a cream yellow precipitate is obtained. The product that is very hygroscopic is dried under reduced pressure over anhydrous calcium chloride. Yield 6.0 g.

The product melts at 130–40° C. with decomposition, is very soluble in water, and has a biologic potency equivalent to 565 µg./mg. (product with 6% of humidity) of the tetracycline standard.

The infrared spectrum (potassium bromide tablet) shows the $6\mu$ tetracycline band subdivided in three at 1575, 1625 and 1640 cm.$^{-1}$. There is also a doublet at 1505 and 1525 cm.$^{-1}$ due to a monosubstituted amide and another band (due to morpholine) at 1100 cm.$^{-1}$.

EXAMPLE 2

N-(pyrrolidinomethyl) tetracycline

Following the procedure described in Example 1, after precipitation with n-butyl alcohol and diethyl ether and washing with hexane and drying over phosphorus pentoxide under reduced pressure, 8.5 gm. of yellow powder were obtained.

The product melts at 160–165° C. with decomposition and has an activity equivalent to 760 µg./mg. of tetracycline. The infrared spectrum presents the band at 1520 cm.$^{-1}$ characteristic of monosubstituted amides.

EXAMPLE 3

N-(morpholinomethyl)hydroxytetracycline

Proceeding as in the previous examples, the reaction product was found to darken when exposed to air. However, working inside a low moisture hood under nitrogen, 7.3 gm. of a cream powder were obtained by insolubilization with diethyl ether.

The product melts at 150° C. with decomposition and the infrared spectrum shows a band at 1525 cm.$^{-1}$.

EXAMPLE 4

N-(morpholinomethyl)tetracycline

To ten grams of tetracycline suspended in 100 ml. of tert-butyl alcohol, 2.5 ml. of dimethylsulfoxide and 2.0 gm. of freshly distilled morpholine are added. The solution was heated with a reflux condenser for 45 minutes, then it was cooled to 25° C. giving 7.1 g. of a crystalline product melting at 140° C.

The infrared spectrum showed the characteristic band previously indicated.

The biological potency is equivalent to 580 µg./mg. of tetracycline.

The technique of the method can vary widely. As stated previously, the reaction proceeds at temperatures to produce good yields in a short time. Temperatures higher than minus 50° C. are generally suitable. The product is conveniently precipitated by another solvent for the reactants such as n-butyl alcohol, diethyl ether, tert-butyl alcohol and mixtures thereof. The ratio of the ingredients is not critical but it is preferable to use the dimethylsulfoxide and nitrogen base in at least stoichiometric amount to maximize conversion of the tetracycline.

EXAMPLE 5

N-(morpholinomethyl)-chlortetracycline

Using the method described in example number 4, this product was prepared and showed the characteristic infrared band at 1525 cm.$^{-1}$.

What I claim is:

1. A method for the preparation of water-soluble derivatives of a tetracycline having the formula:

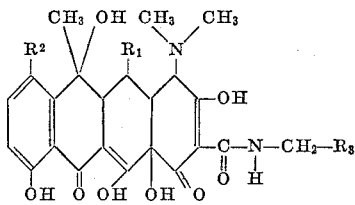

wherein $R_1$ is hydrogen or hydroxyl, $R_2$ is hydrogen or halogen and $R_3$ is the residue of an amine selected from the group consisting of piperidine, morpholine, pyrrolidine, benzylamine, furfurylamine, aniline, N-($\beta$-hydroxyethyl)diethylenediamine, 1 - azaspiro(4,5)decane, and glucosamine which comprises reacting a tetracycline selected from the group consisting of tetracycline, 7-chlortetracycline and 5-hydroxytetracycline with said amine in the presence of dimethylsulfoxide.

2. A method according to claim 1 wherein said amine is morpholine.

3. A method according to claim 1 wherein said amine is pyrrolidine.

4. A method according to claim 1 wherein the temperature of the reaction is maintained at from minus 50° C. up to the reflux temperature.

References Cited

UNITED STATES PATENTS 3,148,113 9/1964 Carlozzi et al. _____ 260—211
3,218,335 11/1965 Scevola.
3,275,652 9/1966 Martell.

LEWIS GOTTS, Primary Examiner

JOHNNIE R. BROWN, Assistant Examiner

U.S. Cl. X.R.

260—211, 294, 326.3, 347.3, 559, 999